United States Patent
Cao

(10) Patent No.: US 6,169,604 B1
(45) Date of Patent: Jan. 2, 2001

(54) NONLINEAR INTERFEROMETER FOR FIBER OPTIC DENSE WAVELENGTH DIVISION MULTIPLEXER UTILIZING A PHASE BIAS ELEMENT TO SEPARATE WAVELENGTHS IN AN OPTICAL SIGNAL

(75) Inventor: Simon X. F. Cao, San Mateo, CA (US)

(73) Assignee: Avanex Corporation, Fremont, CA (US)

(*) Notice: Under 35 U.S.C. 154(b), the term of this patent shall be extended for 0 days.

(21) Appl. No.: 09/247,253

(22) Filed: Feb. 10, 1999

(51) Int. Cl.[7] ....................................... G01B 9/02
(52) U.S. Cl. ............................................. 356/519
(58) Field of Search ....................... 356/352; 359/577, 359/589

(56) References Cited

U.S. PATENT DOCUMENTS

| | | | |
|---|---|---|---|
| 3,582,212 | * 6/1971 | Hesse et al. | 356/112 |
| 4,558,950 | * 12/1985 | Ulrich et al. | 356/345 |
| 4,990,824 | * 2/1991 | Vriens et al. | 313/474 |
| 5,088,815 | * 2/1992 | Garnier et al. | 356/28.5 |
| 5,289,314 | * 2/1994 | Siebert | 359/586 |
| 5,291,332 | * 3/1994 | Siebert | 359/589 |
| 5,381,232 | * 1/1995 | van Wijk | 356/352 |
| 5,719,989 | * 2/1998 | Cushing | 359/589 |
| 6,046,854 | * 4/2000 | Bhagavatula | 359/577 |

OTHER PUBLICATIONS

Optical Society of America, 1998, "Multifunction Optical Filter With A Michelson–Gires–Tournois Interferometer For Wavelength–Division–Multiplexed Network System Applications", Benjamin B. Dingel and Masayuki Izutsu.

Optical Society of America, 1997, "Optical Wave–Front Transformer Using The Multiple–Reflection Interference Effect Inside A Resonator", Benjamin B. Dingel, Masayuki Izutsu and Koji Murakawa.

* cited by examiner

Primary Examiner—Robert Kim
Assistant Examiner—Phil Natividad
(74) Attorney, Agent, or Firm—Sawyer Law Group LLP

(57) ABSTRACT

A nonlinear interferometer wavelength separation mechanism for use in a dense wavelength division multiplexer is provided. The mechanism includes a first glass plate optically coupled to a second glass plate, forming a space therebetween; a mechanism for introducing a phase shift at least one channel of an optical signal; and a mechanism for broadening a pass band of the optical signal. The nonlinear interferometer of the present invention allows a dense wavelength division multiplexer to have an ease in alignment and a higher tolerance to drifts due to the increase in the width of the pass band. It also has the added ability of being passively stable to temperature.

20 Claims, 12 Drawing Sheets

NONLINEAR INTERFEROMETER FOR FIBER OPTIC DENSE WAVELENGTH DIVISION MULTIPLEXER UTILIZING A PHASE BIAS ELEMENT TO SEPARATE WAVELENGTHS IN AN OPTICAL SIGNAL

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple wavelengths may be transmitted along the same optic fiber. This totality of multiple combined wavelengths comprises a single transmitted signal. A crucial feature of a fiber optic network is the separation of the optical signal into its component wavelengths, or "channels", typically by a wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal into its component channels is typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the dense wavelength division multiplexer 230. The new signal is then returned to Loop 150 via node D (290). At the same time, $\lambda_1'$ is transferred from path 280-1 to path 250-1. It is combined with the others of Loop 110's channels into a single optical signal by the dense wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is the precision required of a device for transmitting a signal into an optic fiber. A signal entering a wavelength division multiplexer must conform to a set of very narrow pass bands. FIG. 3 shows a sample spectrum curve 310 comprised of numerous channels as it enters a dense wavelength division multiplexer. The pass bands 320 of the channels are very narrow. Ideally, the curve would be a square wave. A narrow pass band is problematic because, due to the physical limitations and temperature sensitivity of signal source laser devices, they never emit light exactly at the center wavelength of an optical filter. The difference between the actual wavelength and the wavelength at the center of the pass band is called the "offset." The amount of offset or change in offset ("drift") ideally should not be larger than the width of the pass bands. Otherwise, crosstalk between channels will be too large. Crosstalk occurs when one channel or part of a channel appears as noise on another channel adjacent to it. Since the signals resulting from the conventional wavelength division multiplexer configurations have narrow pass bands, the signal source devices ("transmitter"), such as lasers or the like, must be of a high precision so that offset or drift is limited to the width of the pass bands. This high precision is difficult to accomplish. Signal transmitting devices of high precision are available but are very expensive. Also, the signal transmitting devices must be aligned individually for each separator, which is time intensive.

Therefore, there exists a need for a separation mechanism which would allow a wavelength division multiplexer to have a greater tolerance for wavelength offset and an ease of alignment. The present invention addresses such a need.

SUMMARY OF THE INVENTION

A nonlinear interferometer wavelength separation mechanism for use in a dense wavelength division multiplexer is provided. The mechanism includes a first glass plate optically coupled to a second glass plate, forming a space therebetween; a mechanism for introducing a phase shift to at least one channel of an optical signal; and a mechanism for broadening a pass band of the optical signal. The nonlinear interferometer of the present invention allows a dense wavelength division multiplexer to have an ease in alignment and a higher tolerance to drifts due to the increase in the width of the pass bands. It also has the added ability of being passively stable to temperature.

DETAILED DESCRIPTION

The present invention relates to an improvement in the separation mechanism to be used in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The separation mechanism to be used within a separator of a dense wavelength division multiplexer (DWDM) in accordance with the present invention comprises a nonlinear interferometer. This nonlinear interferometer would allow a DWDM to have a higher tolerance to drifts and a greater ease of alignment.

To more particularly describe the features of the present invention, please refer to FIGS. 4 through 10 in conjunction with the discussion below.

Figure 4:
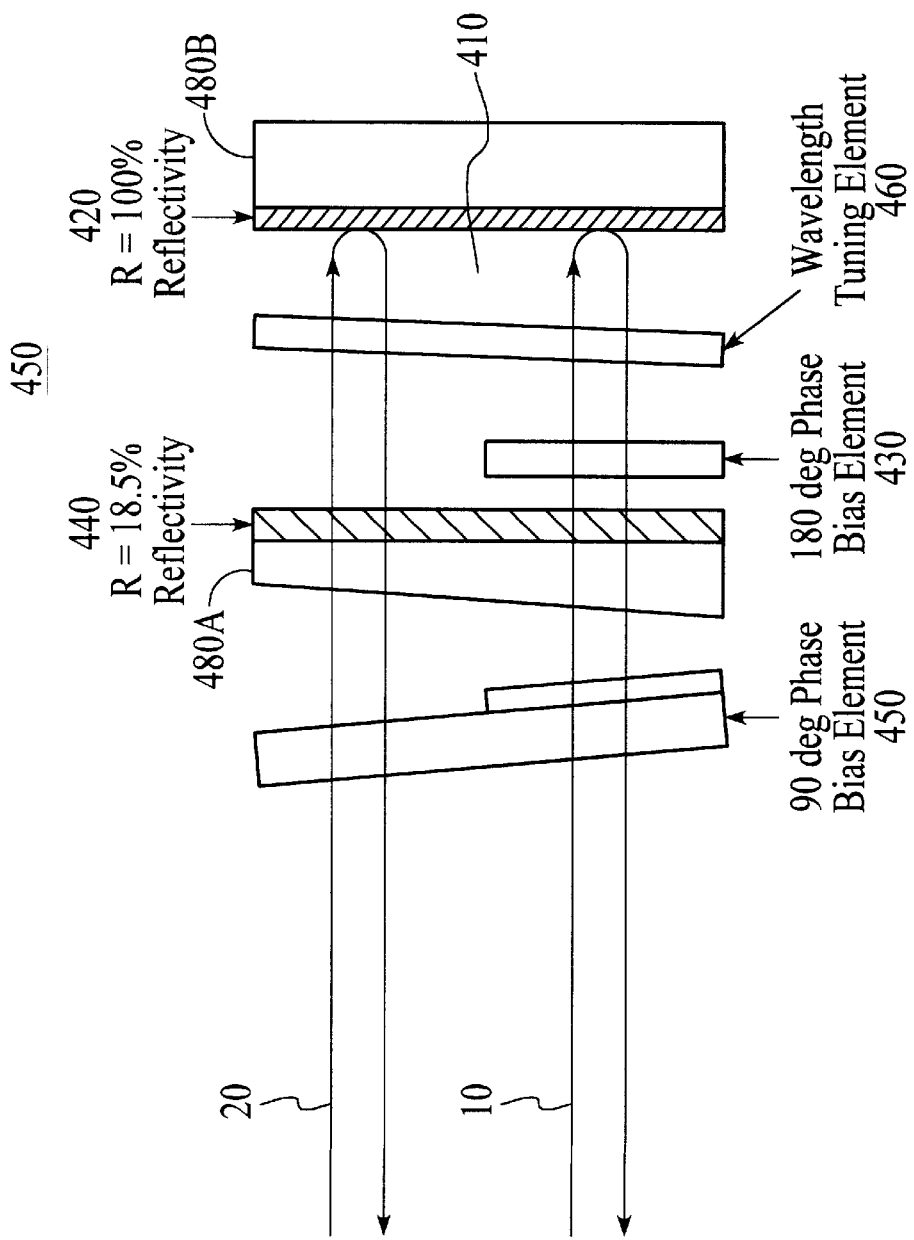
FIG. 4 is an illustration of a first preferred embodiment of a nonlinear interferometer in accordance with the present invention.

FIG. 4 illustrates a preferred embodiment of a nonlinear interferometer in accordance with the present invention. The interferometer 400 would reside within a separator in a DWDM. The interferometer 400 comprises two glass plates 480A–480B, creating a space 410 therebetween. The inside face of the glass plate 480B is coated with a reflective coating 420 with a reflectivity preferably of 100%. The inside face of the glass plate 480A is coated with a reflective coating 440 with reflectivity preferably of approximately 18%. A phase bias element 430, preferably of 180 degrees, is placed between the glass plates 480A and 480B, protruding partially into the space 410. The 180 degree phase bias element 430 will introduce a phase shift of $\pi$ into the even channels of the signal 10 while maintaining the phase of the odd channels in signals 10 and 20. The phase bias element 450, preferably of 90 degrees, and the wavelength tuning element 460 change the shape of the curve of the channels, as will be described later.

Figure 5:
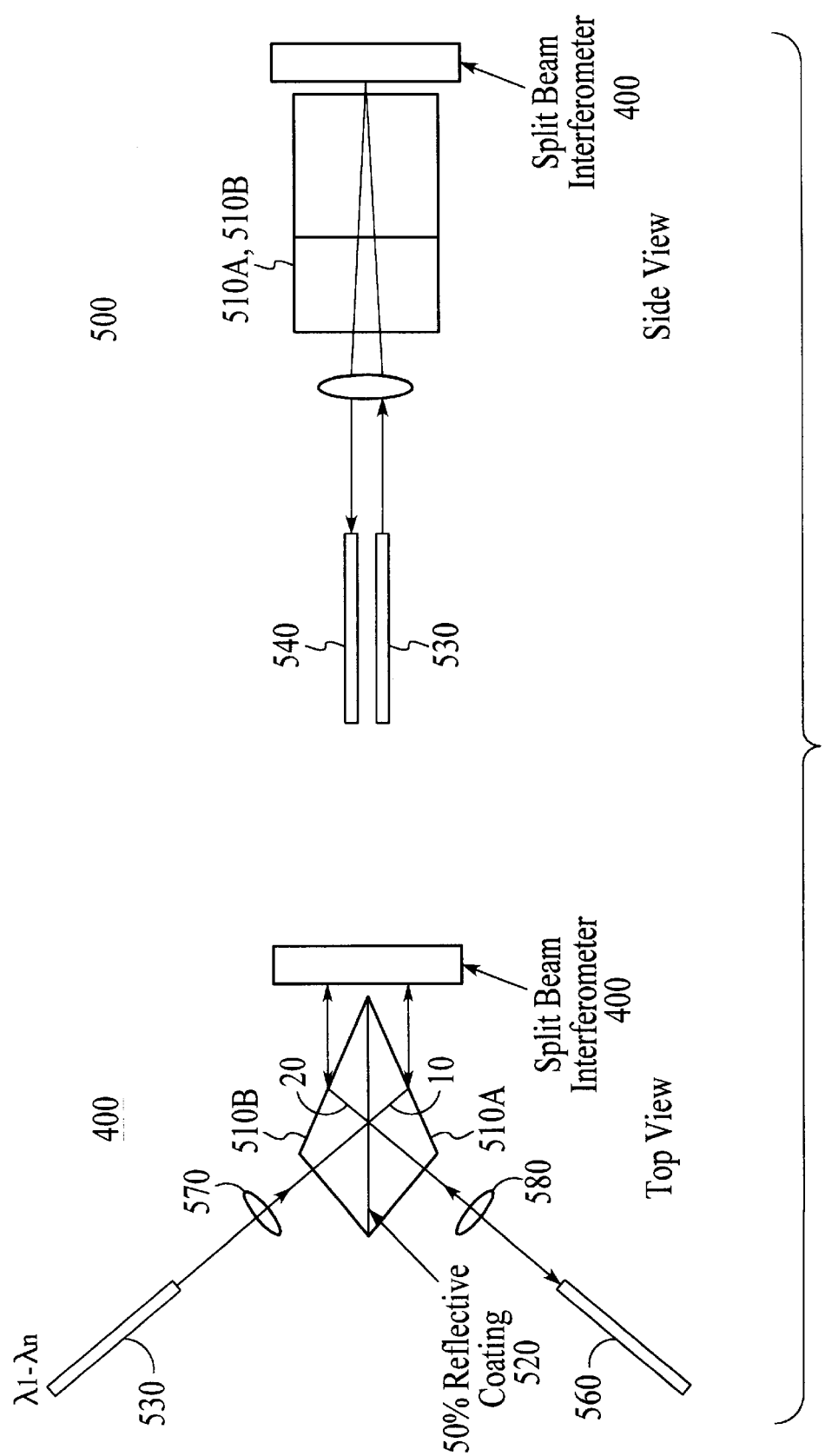
FIG. 5 is an illustration of an embodiment of a separator which may be used with the first preferred embodiment of the nonlinear interferometer of the present invention.

FIG. 5 illustrates one embodiment of a separator which can utilize the nonlinear interferometer 400 of the present invention. This embodiment has been disclosed in U.S. patent application entitled "Fiber Optic Dense Wavelength Division Multiplexer With A Phase Differential Method Of Wavelengths Separation Utilizing Glass Blocks And A Nonlinear Interferometer," Ser. No. 09/248,021, filed on Feb. 10, 1999. Applicant hereby incorporates this patent application by reference. The separator 500 comprises an input fiber 530 for inputting an optical signal, and two output fibers 540 and 560. It comprises two lenses 570 and 580 which collimate the input signal as it comes from the input fiber 530 and converge the output signal to the output fibers 540 and 560. It also comprises two blocks ofglass 510A–510B placed next to each other. Adjacent to one side of the blocks 510A and 510B is a nonlinear interferometer 400 of the present invention which introduces a phase difference into the even channels while maintaining the same phase for the odd channels. At the place where the two blocks 510A–510B meet, the glass is coated with a reflective coating 520 with a reflectivity, for example, of 50%.

The reflective coating 520 splits the optical signal containing $\lambda_1$–$\lambda_n$ into at least two portions 10 and 20. In the preferred embodiment, the reflective coating 520 is polarization insensitive. The nonlinear interferometer 400 then introduces a $\pi$ phase difference into the even channels of signal 10 which travels through the 180 degree phase bias element 430 (FIG. 4) while maintaining the phase of the odd channels of signals 10 and 20. The two output fibers 540 and 560 are then aligned, or placed at a particular distance from the separator 500, such that even channels are captured in one fiber while the odd channels are captured in the other.

Figure 6:
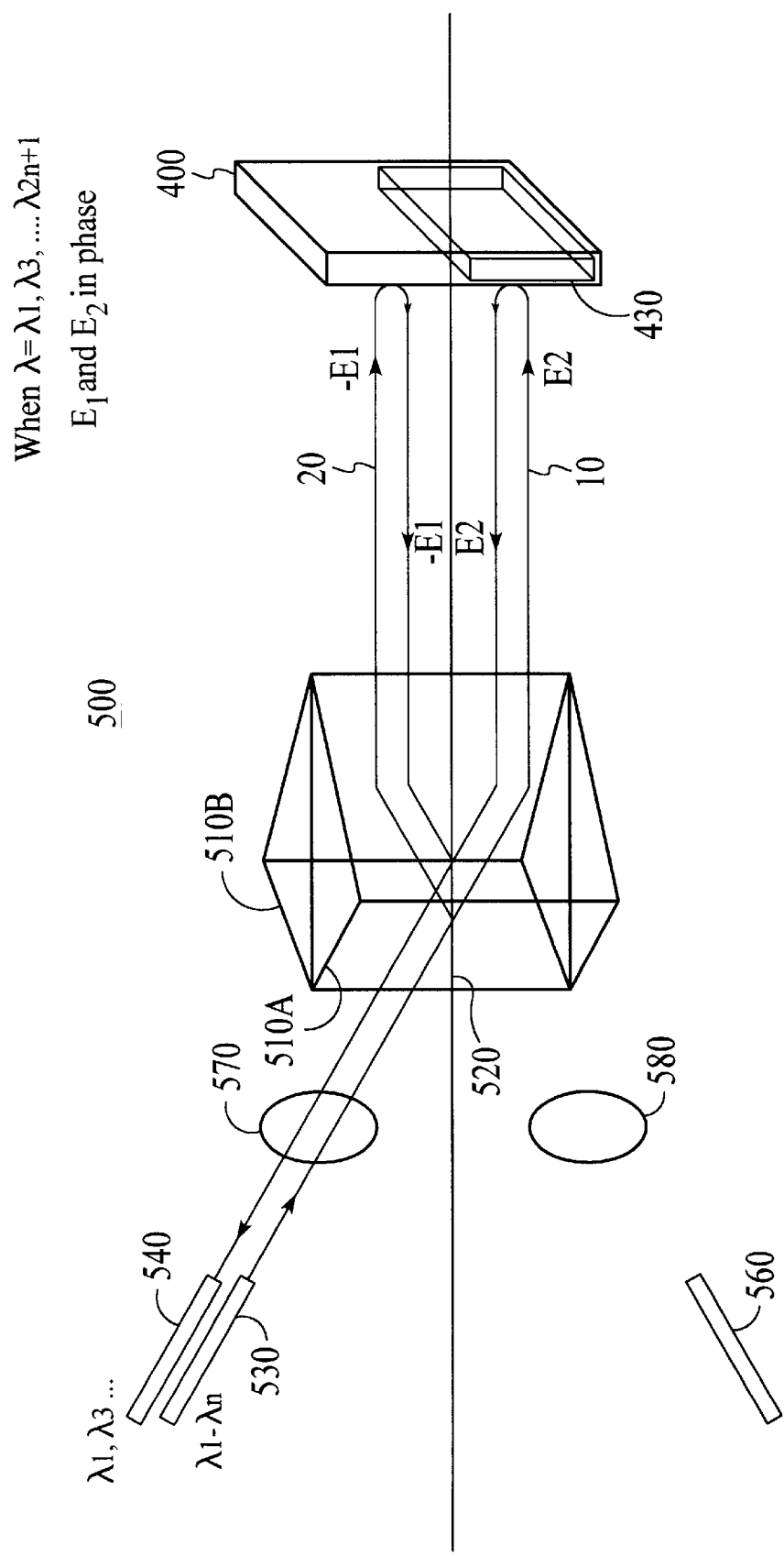
FIG. 6 is an illustration of odd channels traveling through the separator with the first preferred embodiment of the present invention.

FIG. 6 illustrates the odd channels of an input signal as it travels through the separator 500 which may contain the interferometer 400 of the present invention. An input signal ($\lambda_1$–$\lambda_n$) enters the separator 500 through input fiber 530. The signal travels through the lens 570 which collimates the signal and directs it toward the glass blocks 510A and 510B. The signal travels through the glass blocks 510A and 510B, and when it reaches the 50% reflective coating 520, it is split into two signals 20 (–E1) and 10 (E2). Signal 20 travels to and back from the interferometer 400 without a change in its phase. Signal 10 also travels to and back from the interferometer 400, including the 180 degree phase bias element 430, but no phase change is introduced into its odd channels. Thus, when the odd channels of signals 10 and 20 travel back from the interferometer 400, they are in phase. The signals 10 and 20 travel through the glass blocks 510A and 510B again. When they reach the 50% reflective coating 520 again, they travel to the same location, output fiber 540, which is placed in a position such that the phase of the odd channels are captured.

Figure 7:
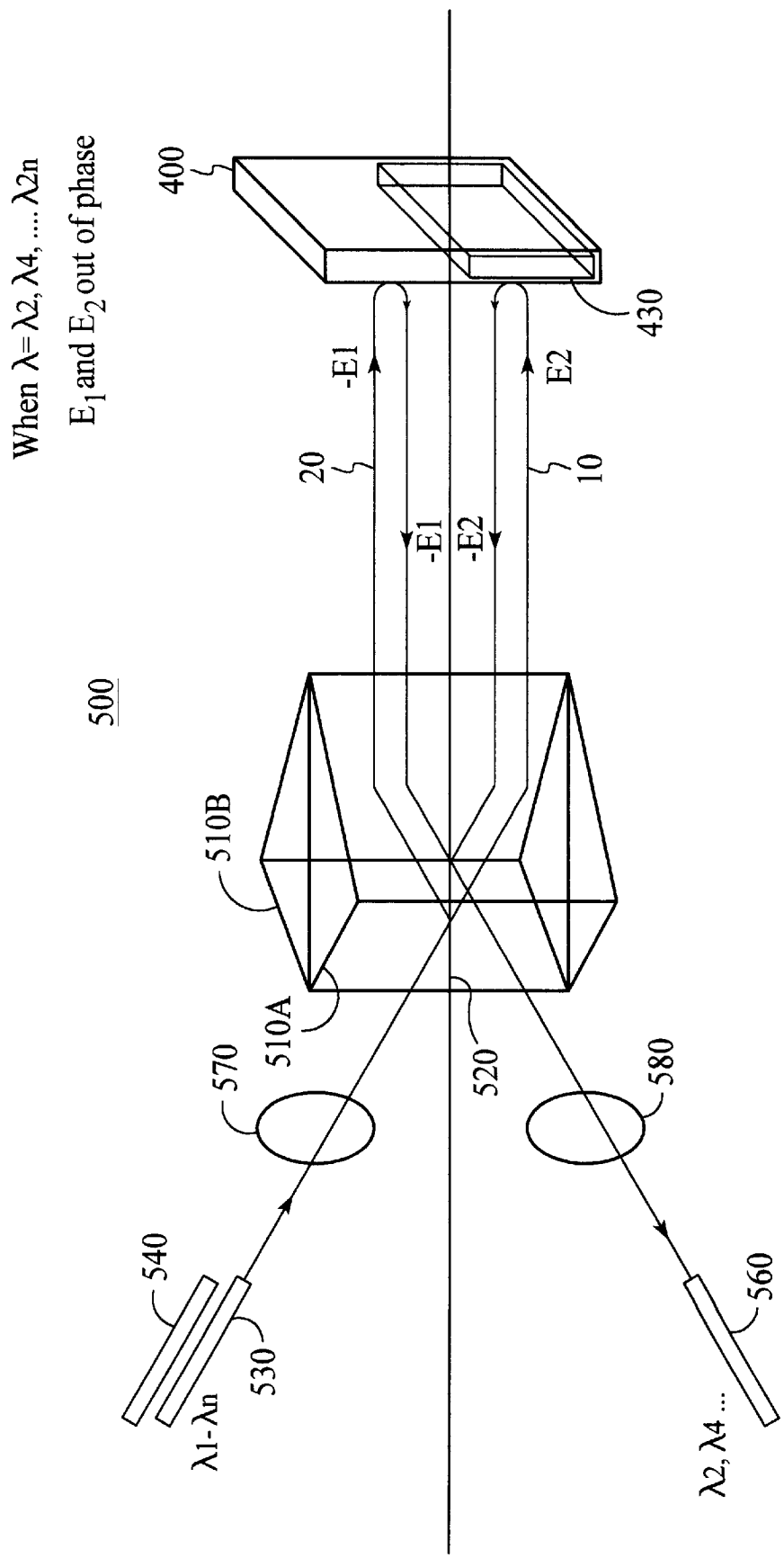
FIG. 7 is an illustration of even channels traveling through the separator with the first preferred embodiment of the nonlinear interferometer of the present invention.

FIG. 7 illustrates the even channels of an input signal as it travels through the separator 500 which may contain the interferometer 400 of the present invention. The even channels travel through the separator 500 in same manner as the odd channels, described above with FIG. 6, however, when the even channels of signal 10 enter the interferometer 400, they travel through the 180 degree phase bias element 430 which introduces a 180° phase change. When the signals 10 and 20 travel back from the interferometer 400, their even channels are out of phase. When they reach the 50% reflective coating again 520, the even channels with the phase change travel to output fiber 560, which is positioned such that the phase of the even channels are captured.

The nonlinear interferometer 400 is constructed with a cavity 410 with a 100% reflecting mirror 480B on one side and phase bias elements 430 and 450 inside and outside of the cavity 410. The cavity 410 is basically a well known Gires-Tournois etalon. (See "Optical Waves In Crystals" by Amnion Yariv and Pochi-yeh, John Wiley and Sons, 1984, p. 291.) Because of the 100% mirror 480B, all the incident light will be reflected back by the cavity 410 with a phase shift of reflection ω, $$\Phi = -2\tan^{-1}\left(\frac{1+\sqrt{R}}{1-\sqrt{R}}\tan\phi\right)$$

where R is the reflectivity of the front mirror 480A, and $2\phi$ is round trip phase gain in the cavity 410 given by $$\phi = \frac{2\pi}{\lambda}L_O$$

$L_O$ being the optical path length of the cavity 410. An additional 180° phase bias element 430 is inserted in the cavity 410 for one of beams 10 and 20 only. A 90° phase bias element 450 is placed outside the cavity 410. Therefore the phase shift difference experienced between light from 10 and 20 is the following:

$$\Delta\Phi = -2\tan^{-1}\left(\frac{1+\sqrt{R}}{1-\sqrt{R}}\tan\phi\right) + 2\tan^{-1}\left(\frac{1+\sqrt{R}}{1-\sqrt{R}}\tan\left(\phi+\frac{\pi}{2}\right)\right) - \frac{\pi}{2}$$

The interference between these two beams 10 and 20 after they are recombined by the 50% splitter 520 results in a standard interference intensity pattern.

$$I_1 = I_O\cos^2\left(\frac{\Delta\Phi}{2}\right) \qquad I_2 = I_O\sin^2\left(\frac{\Delta\Phi}{2}\right)$$

where $I_O$ is the initial light intensity, $I_1$ is the light intensity directed toward fiber 540 and $I_2$ is the light intensity directed toward fiber 560. The spectrum 340 of $I_1$ is plotted in FIG. 3. The period between transmission peaks is determined by the optical length $L_O$ of the cavity 410. The shape of the spectrum however is determined by the front mirror 480A reflectivity R.

The 90 degree bias element 450 and the wavelength tuning element 460 fine tune the shapes and positions of the pass bands and isolation bands to their desired properties.

Figure 1:
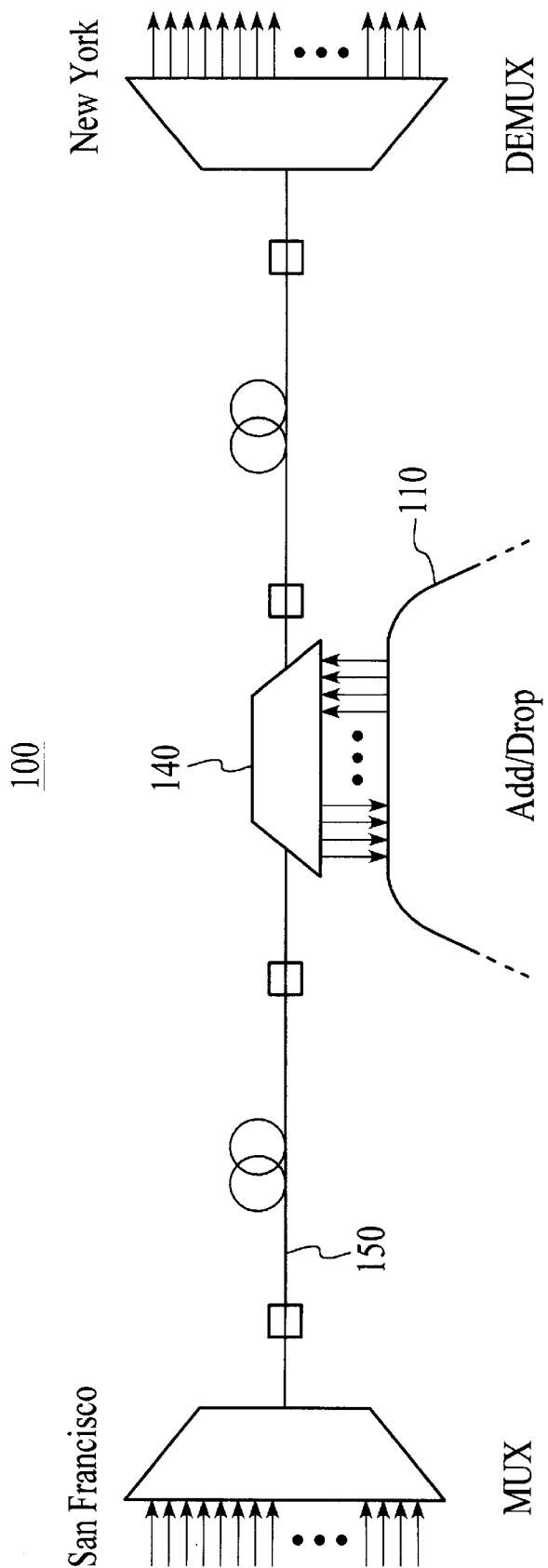
FIG. 1 is an illustration of a simplified optical network.
Figure 2:
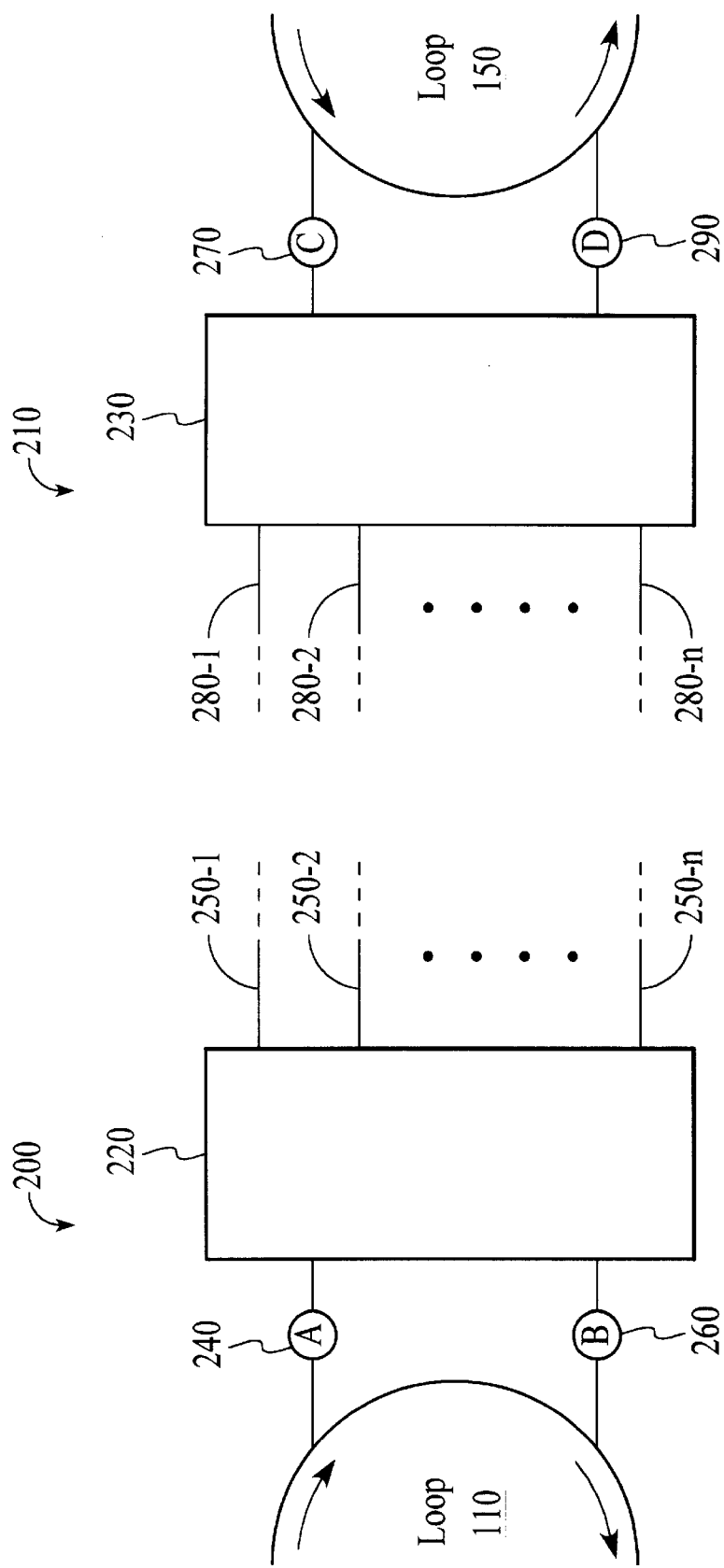
FIG. 2 is an illustration of conventional add/drop systems and dense wavelength division multiplexers.
Figure 3:
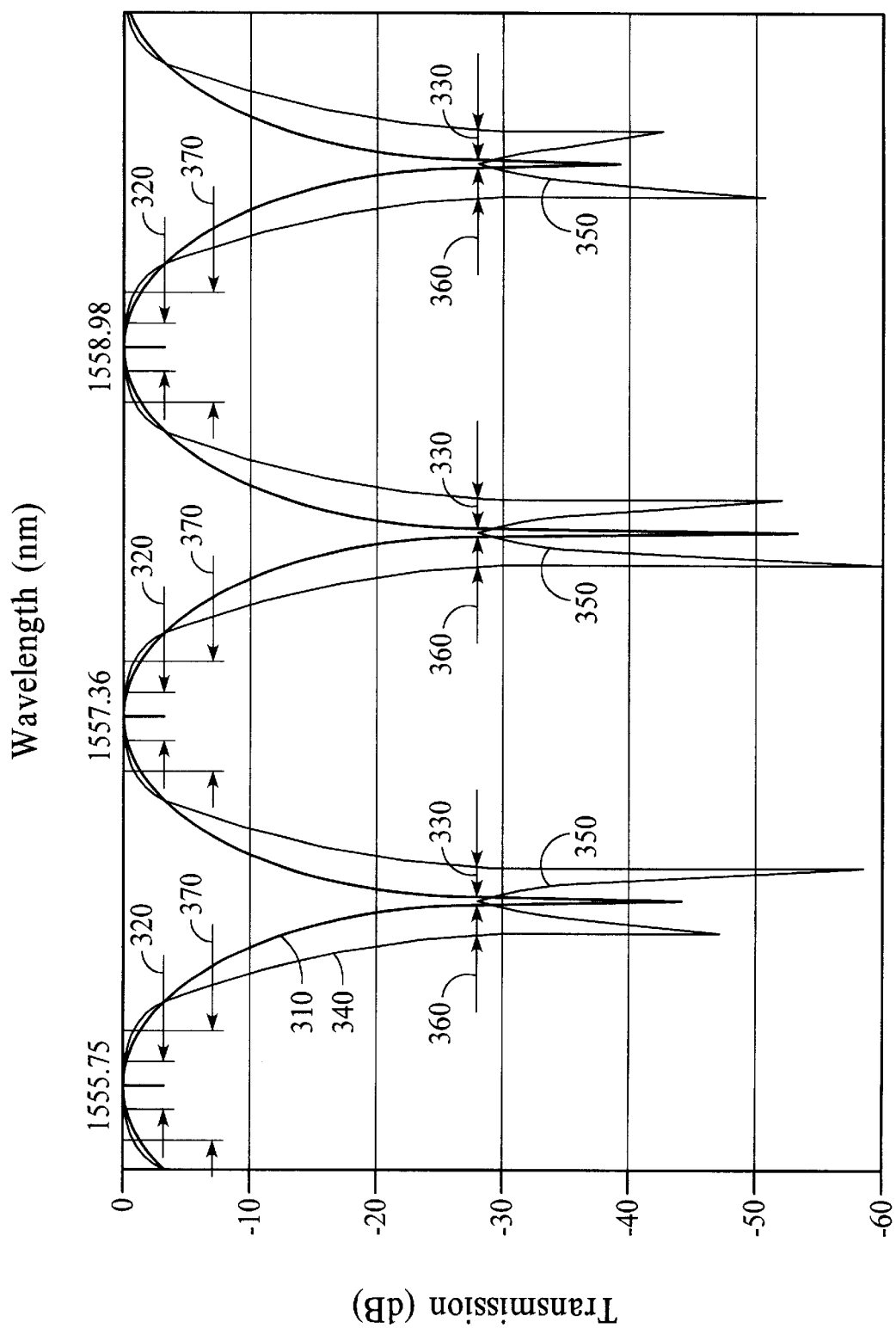
FIG. 3 is a graph of two sample spectrum curves, each comprised of several channels, as they enter, respectively, a conventional dense wavelength division multiplexer and a dense wavelength division multiplexer in accordance with the present invention.

To illustrate the advantage of flattening the curve tips and allowing a small amount of band-shape distortion, please refer back to FIG. 3. FIG. 3 is a graph of spectrum curve 310 of a signal which would result if the reflective coating 440 has a reflectivity of 0%. This curve 310 has no crosstalk but has a very narrow isolation band 330 and a narrow pass band 320. The spectrum curve 340 is a signal which would result if the reflective coating 540 has a reflective index of approximately 18%. There is a small amount of band-shape distortion 350 and the isolation band 360 is significantly wider. In addition, the tips of the curve are flatter, resulting in a wider pass band 370. The amount of flattening and band-shape distortion allowed can be manipulated by selecting a reflective coating with a certain reflectivity. Thus, the separator 500, through manipulation of its interferometer 400 of the present invention, can be used to broaden the pass and isolation bands, which makes the curve more stable and tolerant to drift.

Figure 8:
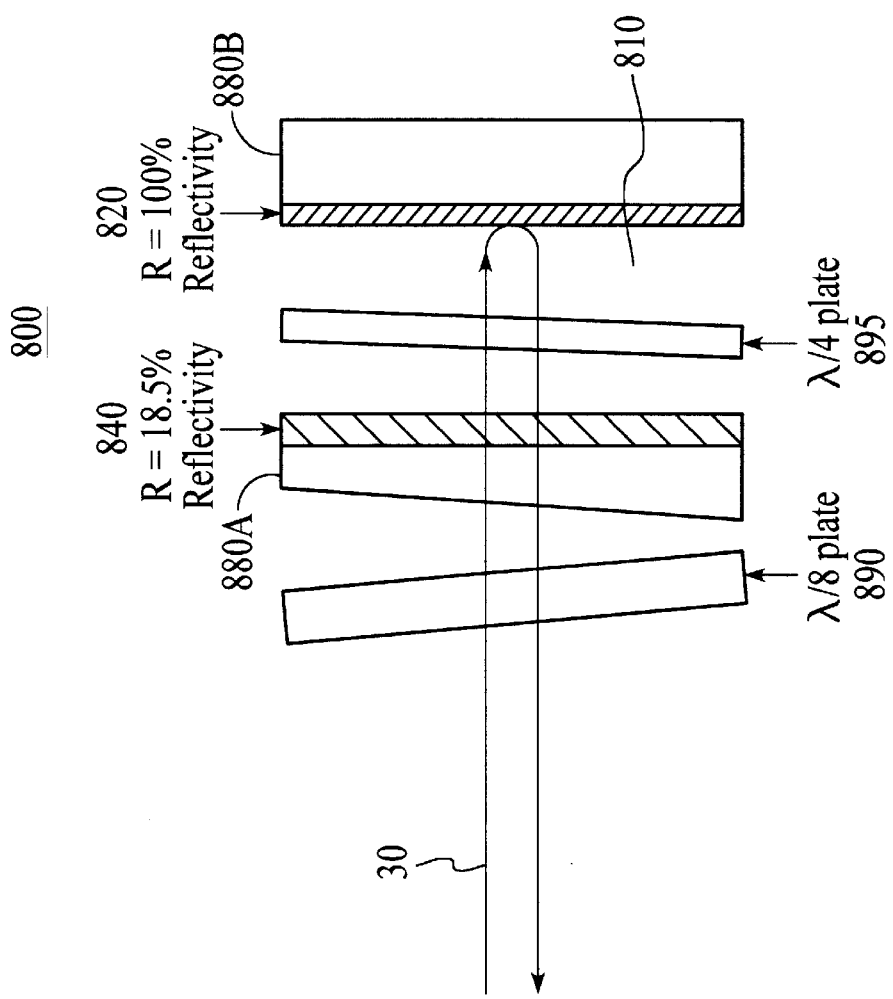
FIG. 8 is an illustration of a second preferred embodiment of a nonlinear interferometer in accordance with the present invention.

FIG. 8 illustrates a second preferred embodiment of an interferometer in accordance with the present invention. The interferometer 800 comprises two glass plates 880A and 880B. The inside face of the glass plate 880B is coated with a layer of reflective coating 820 with a reflectivity preferably of 100%. The inside face of the glass plate 880A is coated with a layer of reflective coating 840 with a reflectivity preferably of approximately 18%.

When signal 30 enters the interferometer 800, it passes through the 18% reflective coating 840 and a waveplate 895 preferably of λ/4.

The polarization splitting interferometer 800 is similar to the beam splitting interferometer 400, except the λ/4 plate 895 introduces an 180° round trip phase change between a o beam and e beam of the signal inside the cavity 810, and the external λ/8 plate 890 introduces the round trip 90° phase change between the o beam and e beam.

The waveplate 890, preferably of λ/8, fine tunes the shape of the signal 30 in the same manner as the 90 degree phase bias element 450 (FIG. 4) of the first preferred embodiment.

The second preferred embodiment of the interferometer 800 as illustrated in FIG. 8 is temperature sensitive. The rear glass plate 880B and the waveplate 895 will expand/contract with changes in temperature. These expansions/contractions will change the length of separation between them, varying the functioning of the interferometer 800.

Figure 9:
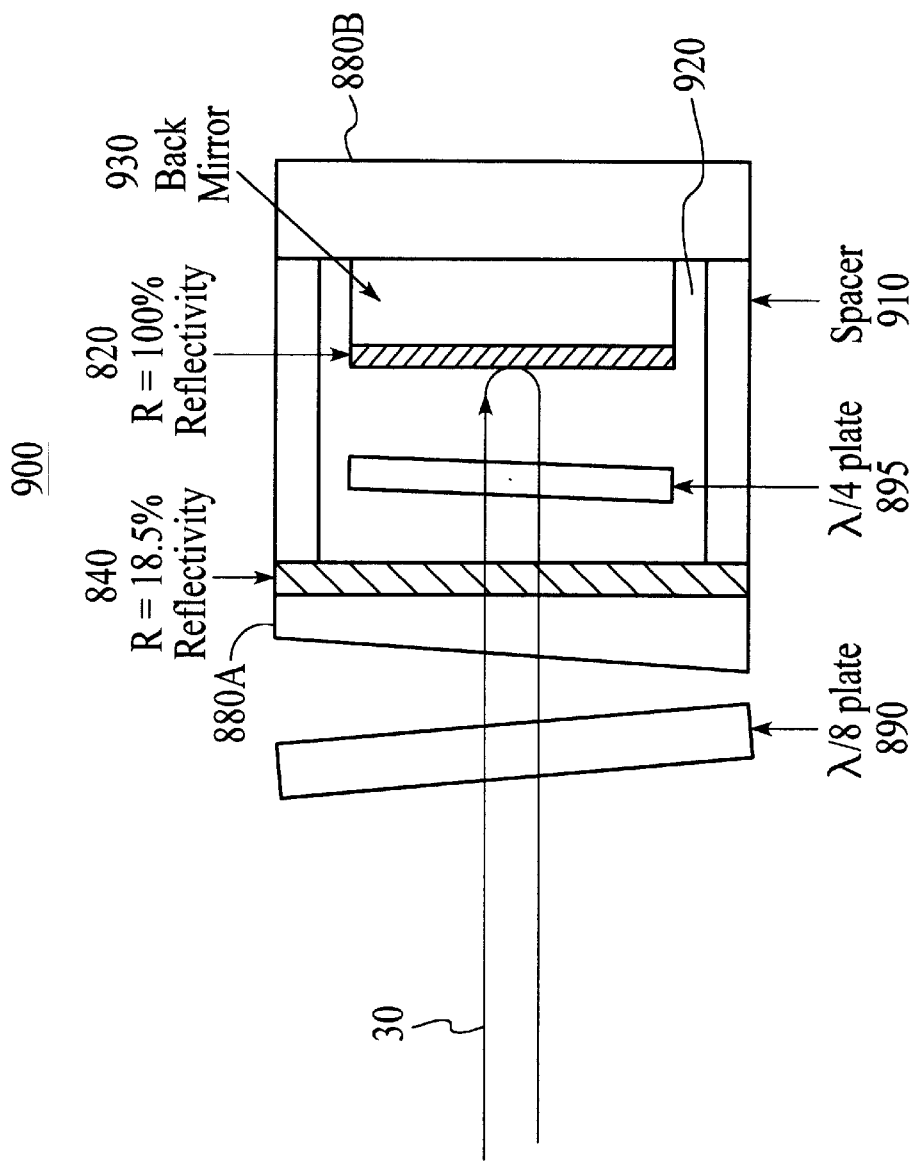
FIG. 9 is an illustration of a third preferred embodiment of a nonlinear interferometer in accordance with the present invention.

FIG. 9 illustrates a third preferred embodiment of the interferometer in accordance with the present invention. The interferometer 900 is the same as the interferometer 800 except the two glass plates 880A–880B are set apart by zero expansion cavity spacers 910, creating a main cavity 920. The zero expansion cavity spacers 910 are composed of a temperature insensitive material so they do not expand/contract with changes in temperature. A back mirror 930 is attached to the glass plate 880B. In this embodiment, the reflective coating 820 is on the back mirror 930 rather than the glass plate 880B. Although the zero expansion cavity spacers 910 keep the length of the cavity 920 constant, the waveplate 895 and the back mirror 930 may expand/contract with changes in temperature, varying the functioning of the interferometer 900. A temperature controller (not shown) may be coupled to the interferometer 900 so that the expansions of the back mirror 930 and the waveplate 895 cancel each other out, maintaining a constant distance between them.

Figure 10:
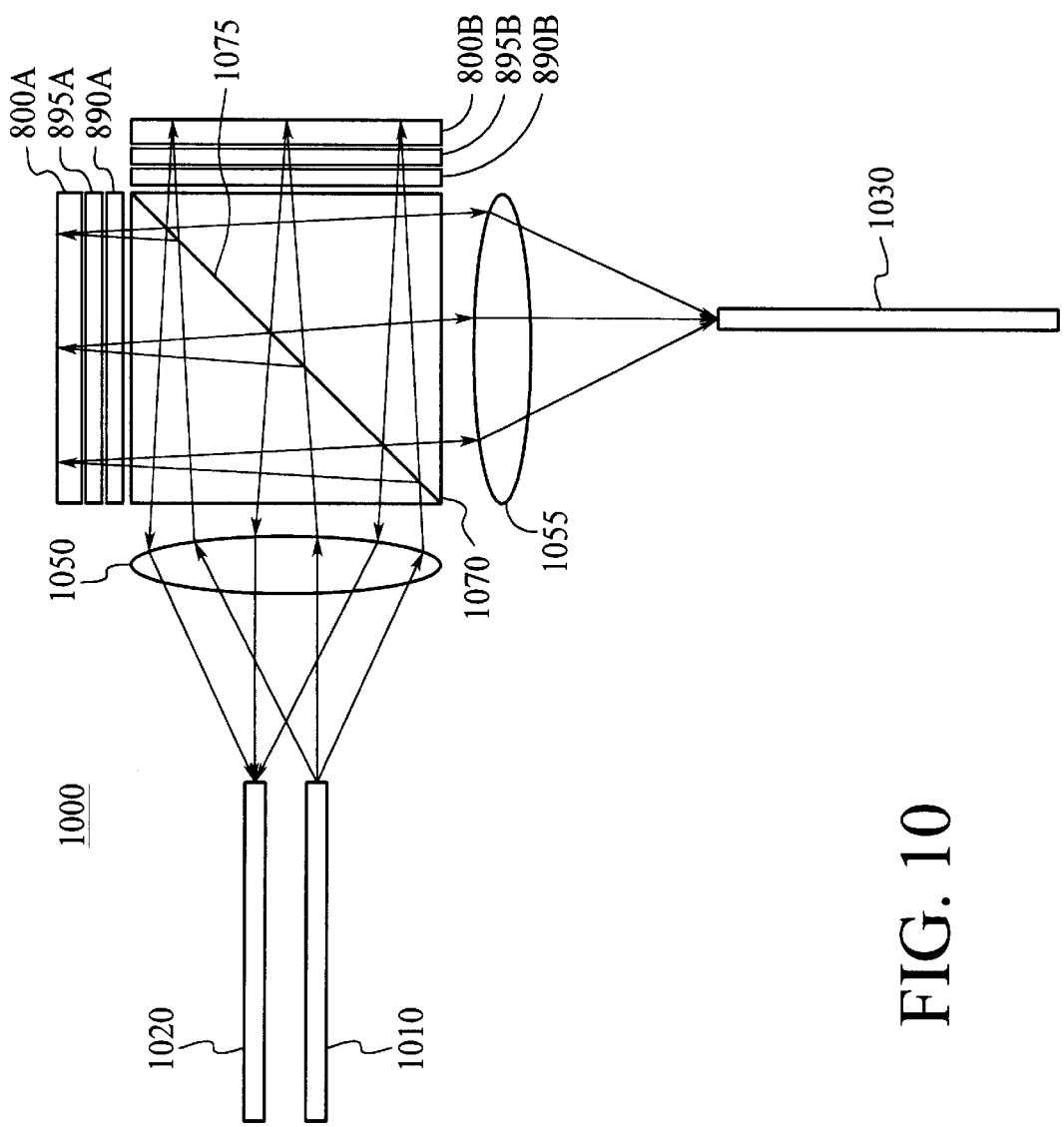
FIG. 10 is an illustration of an embodiment of a separator which may be used with the second and third preferred embodiments of the nonlinear interferometer of the present invention.

FIG. 10 illustrates a top view of a preferred embodiment of a separator which may be used with the second and third preferred embodiments of the interferometers of the present invention. For the purpose of describing this separator 1000, an interferometer with the structure illustrated in FIG. 8 is used. The separator 1000 comprises an optical fiber 1010 for inputting an optical signal and optical fibers 1020 and 1030 for outputting optical signals. As the signal leaves the optic fiber 1010, it diffuses.

A lens 1050 contains the signal and directs it towards a beam splitter 1070 which decomposes the signal based upon its polarity. This decomposition takes place at the body diagonal junction plane 1075 of the beam splitter 1070. The component (p-component) of the input signal polarized within the plane defined by the input signal's direction of travel and a line perpendicular to junction plane 1075 passes through beam splitter 1070 towards an interferometer 800B. The component (s-component) of the input signal polarized parallel to junction plane 1075 passes trough beam splitter 1070 towards an interferometer 800B. The interferometers 800A and 800B introduce phase differences between the even and odd channels of the signals.

Figure 11:
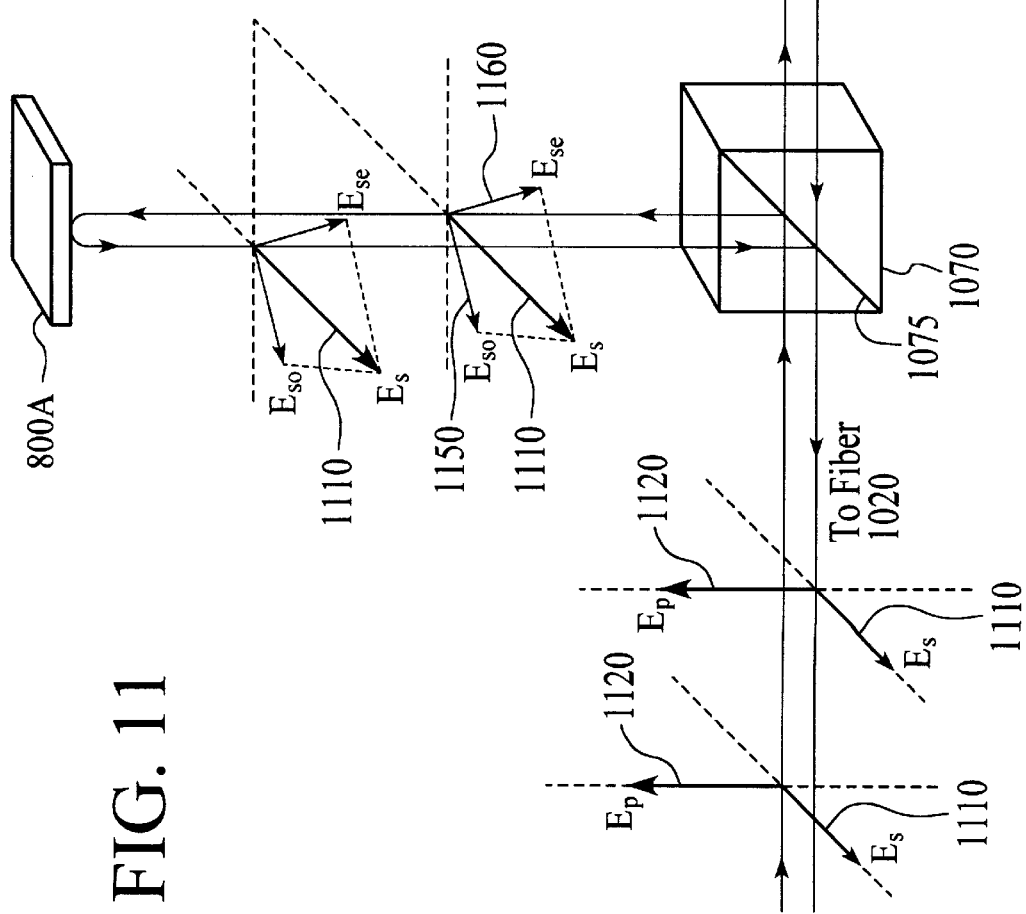
FIG. 11 is an illustration of odd channels as they travel through the separator with the second preferred embodiment of the nonlinear interferometer of the present invention

FIG. 11 illustrates the path of the odd channels as they travel through the separator 100 with the interferometer 800A and 800B of the present invention. The odd channels travel to the polarization beam splitter 1070 from the input fiber 1010. Each channel has an s polarity component ($E_s$) 1110 and ap polarity component ($E_p$) 1120. The $E_s$ and $E_p$ signals may each be decomposed into $E_o$ and $E_e$ components parallel to the principal ray directions of the birefringent elements in interferometer 800B and 800A, respectively. These components are well known in the art and will not further be described here. The vector $E_p$ 1120 is decomposed into components $E_{po}$ 1130 and $E_{pe}$ 1140 whereas the vector $E_s$ 1110 is decomposed into components $E_{so}$ 1150 and $E_{se}$ 1160. This decomposition is illustrated in FIG. 11 for each of the signal polarization component vectors $E_s$ and $E_p$ both before its entry into and after its exit from the interferometer 800A and 800B, respectively. The signal $E_p$ 1120 travels to the interferometer 800B while $E_s$ 1110 travels to interferometer 800A. Both sets of signals are reflected by their interferometers 800A and 800B without a phase shift difference between $E_{so}$ 1150 and $E_{se}$ 1160 (or between $E_{po}$ 1130 and $E_{pe}$ 1140). Thus, both the signal $E_p$ 1120 and the signal $E_s$ 1110 travel back to the polarization beam splitter 1070 without a change in orientation. These signals then travel back through the polarization beam splitter 1070 to output fiber 1020.

Figure 12:
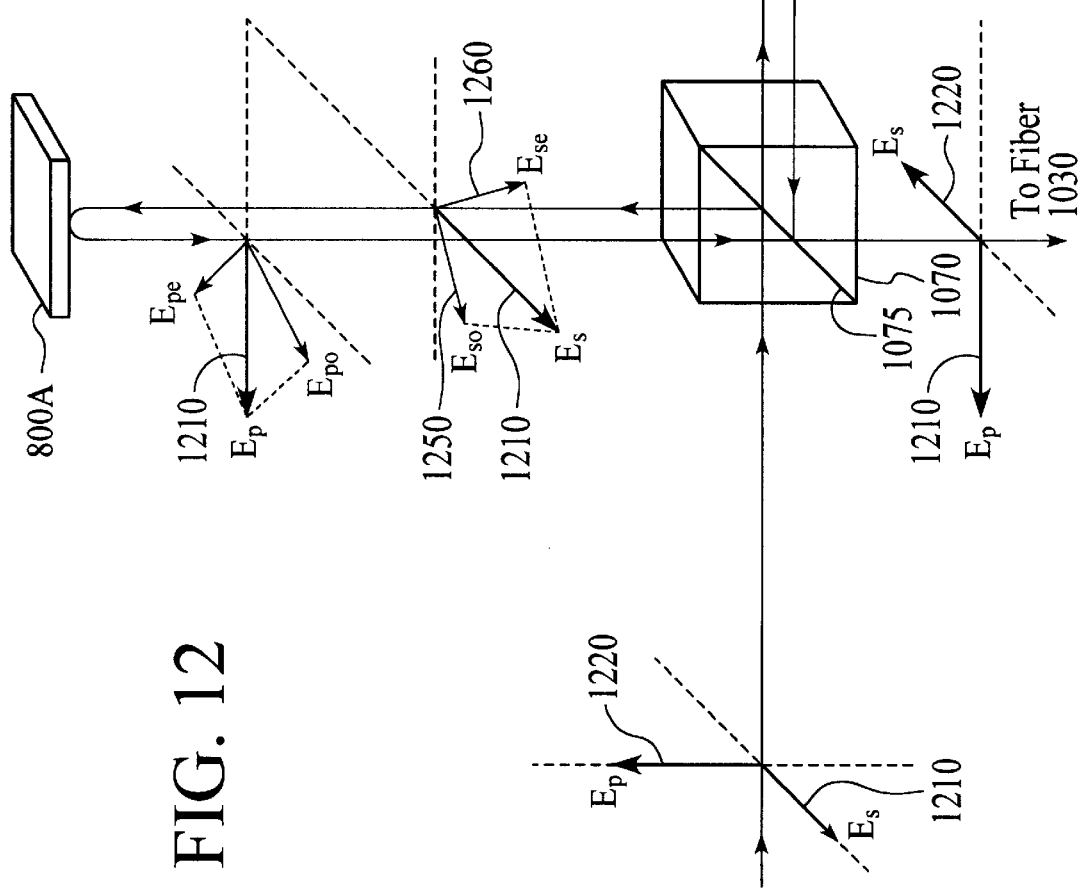
FIG. 12 is an illustration of even channels as they travel through the separator with the second preferred embodiment of the nonlinear interferometer of the present invention.

FIG. 12 illustrates the path of the even channels as they travel through the separator 1000 with the interferometer 800A and 800B of the present invention. As with the odd channels, the even channels travel to the polarization beam splitter 1070 from the input fiber 1010. Each channel has an s polarity component ($E_s$) 1210 and ap polarity component ($E_p$) 1220. As with the odd channels, the $E_s$ and $E_p$ signals may each be decomposed into $E_o$ and $E_e$ components parallel to the principal ray directions of the birefringent elements in interferometer 800A and 800B, respectively. The vector $E_p$ 1220 is decomposed into components $E_{po}$ 1230 and $E_{pe}$ 1240 whereas the vector $E_s$ 1210 is decomposed into components $E_{so}$ 1250 and $E_{se}$ 1260. This decomposition is illustrated in FIG. 12 for each of the signal vectors $E_s$ and $E_p$ both before its entry into and after its exit from the interferometer 800A and 800B, respectively. The signal $E_p$ 1220 travels to the interferometer 800B while the signal $E_s$ 1210 travels to interferometer 800A. For the even channels, interferometers 800A and 800B introduce a $\pi$ phase difference between $E_{po}$ 1230 and $E_{pe}$ 1240 and also between $E_{so}$ 1250 and $E_{se}$ 1260 respectively. This phase difference causes an effective $\pi/2$ rotation of each of the signals 1210 and 1220, thereby converting them from $E_s$ into $E_p$ and from $E_p$ into $E_s$, respectively. When both of these signals travel through beam splitter 1070 again, this rotation causes them to travel to output fiber 1030. Thus, in this manner, output fiber 1020 contains the odd channels while output fiber 430 contains the even channels.

A nonlinear interferometer separation mechanism for use within a dense wavelength division multiplexer has been disclosed. The nonlinear interferometer allows a dense wavelength division multiplexer to have an ease in alignment and a higher tolerance to drifts due to the increase in the width of the pass band. It also has the added ability of being passively stable to temperature.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A nonlinear interferometer comprising:
   (a) a first glass plate optically coupled to a second glass plate, forming a space therebetween, wherein the first glass plate is wedge shaped;
   (b) a phase bias element residing inside the space wherein the phase bias element introduces a phase shift between a first wavelength in a first channel and a second wavelength in a second channel in an optical signal;
   (c) a first reflective coating residing inside the space and on the second glass plate; and
   (d) a second reflective coating residing inside the space and on the first glass plate, wherein the first and second reflective coatings broadens a pass band of the optical signal wherein the first reflective coating is maintained at a fixed distance from the second reflective coating.

2. The nonlinear interferometer of claim 1, wherein the first reflective coating (c) comprises a reflective coating with a reflectivity of approximately 100%.

3. The nonlinear interferometer of claim 1, wherein the phase bias element (b) is a 180 degree phase bias element.

4. The nonlinear interferometer of claim 1, wherein the second reflective coating (d) comprises a reflective coating with a reflectivity of approximately 18%.

5. A nonlinear interferometer comprising:
   (a) a first glass plate optically coupled to a second glass plate, forming a space therebetween, wherein the first glass plate is wedge shaped;
   (b) a waveplate residing inside the space, wherein the waveplate introduces a phase shift between a first wavelength of a first channel and a second wavelength of a second channel in an optical signal;
   (c) a first reflective coating residing inside the space and on the second glass plate; and
   (d) a second reflective coating residing inside the space and on the first glass plate,
wherein the first and second reflective coatings broadens a pass band of the optical signal, wherein the first reflective coating is maintained at a fixed distance from the second reflective coating.

6. The nonlinear interferometer of claim 5, wherein the first reflective coating (c) comprises a reflective coating with a reflectivity of approximately 100%.

7. The nonlinear interferometer of claim 5, wherein the waveplate is a $\lambda/4$ waveplate.

8. The nonlinear interferometer of claim 5, wherein the second reflective coating (d) comprises a reflective coating with a reflectivity of approximately 18%.

9. A nonlinear interferometer comprising:
(a) a first glass plate optically coupled to a second glass plate, forming a space therebetween;
(b) a first phase bias element residing inside the space wherein the first phase bias element introduces a phase shift between a first wavelength in a first channel and a second wavelength in a second channel in an optical signal;
(c) a first reflective coating residing inside the space and on the second glass plate;
(d) a second reflective coating residing inside the space and on the first glass plate, wherein the first and second reflective coatings broadens a pass band of the optical signal wherein the first reflective coating is maintained at a fixed distance from the second reflective coating; and
(e) a second phase bias element residing outside the space and optically coupled to the first glass plate, wherein the second phase bias element tunes a shape and a position of the pass band and an isolation band of the optical signal.

10. The nonlinear interferometer of claim 9, wherein the first phase bias element is a 90 degree bias element.

11. The nonlinear interferometer of claim 9, wherein the second phase bias element is a $\lambda/8$ waveplate.

12. A nonlinear interferometer comprising:
(a) a first glass plate optically coupled to a second glass plate, forming a space therebetween;
(b) a first waveplate residing inside the space, wherein the first waveplate introduces a phase shift between a first wavelength of a first channel and a second wavelength of a second channel in an optical signal;
(c) a first reflective coating residing inside the space and on the second glass plate;
(d) a second reflective coating residing inside the space and on the first glass plate, wherein the first and second reflective coatings broadens a pass band of the optical signal, wherein the first reflective coating is maintained at a fixed distance from the second reflective coating; and
(e) a second waveplate residing outside the space and optically coupled to the first glass plate, wherein the second waveplate tunes a shape and a position of the pass band and an isolation band of the optical signal.

13. The nonlinear interferometer of claim 12, wherein the first waveplate is a $\lambda/4$ waveplate.

14. The nonlinear interferometer of claim 12, wherein the second waveplate is a $\lambda/8$ waveplate.

15. A nonlinear interferometer comprising:
(a) a first glass plate optically coupled to a second glass plate, forming a space therebetween, wherein the first glass plate is wedge shaped;
(b) a first phase bias element residing inside the space wherein the first phase bias element introduces a phase shift between a first wavelength in a first channel and a second wavelength in a second channel in an optical signal;
(c) a first reflective coating residing inside the space and on the second glass plate;
(d) a second reflective coating residing inside the space and on the first glass plate, wherein the first and second reflective coatings broadens a pass band of the optical signal wherein the first reflective coating is maintained at a fixed distance from the second reflective coating; and
(e) a second phase bias element residing outside the space and optically coupled to the first glass plate, wherein the second phase bias element tunes a shape and a position of the pass band and an isolation band of the optical signal.

16. The nonlinear interferometer of claim 15, wherein the first phase bias element is a 90 degree bias element.

17. The nonlinear interferometer of claim 15, wherein the second phase bias element is a $\lambda/8$ waveplate.

18. A nonlinear interferometer comprising:
(a) a first glass plate optically coupled to a second glass plate, forming a space therebetween, wherein the first glass plate is wedge shaped;
(b) a first waveplate residing inside the space, wherein the first waveplate introduces a phase shift between a first wavelength of a first channel and a second wavelength of a second channel in an optical signal;
(c) a first reflective coating residing inside the space and on the second glass plate;
(d) a second reflective coating residing inside the space and on the first glass plate, wherein the first and second reflective coatings broadens a pass band of the optical signal, wherein the first reflective coating is maintained at a fixed distance from the second reflective coating; and
(e) a second waveplate residing outside the space and optically coupled to the first glass plate, wherein the second waveplate tunes a shape and a position of the pass band and an isolation band of the optical signal.

19. The nonlinear interferometer of claim 18, wherein the first waveplate is a $\lambda/4$ waveplate.

20. The nonlinear interferometer of claim 18, wherein the second waveplate is a $\lambda/8$ waveplate.

* * * * *